US008647600B2

(12) United States Patent
Liu et al.

(10) Patent No.: US 8,647,600 B2
(45) Date of Patent: Feb. 11, 2014

(54) METHODS FOR PREPARING AND REGENERATING MATERIALS CONTAINING AMORPHOUS IRON OXIDE HYDROXIDE AND DESULFURIZER COMPRISING THE SAME

(75) Inventors: Zhenyi Liu, Beijing (CN); Ke Lin, Beijing (CN); Qunyang Gao, Beijing (CN)

(73) Assignee: Beijing Sanju Environmental Protection and New Material Co., Ltd., Beijing (CN)

( * ) Notice: Subject to any disclaimer, the term of this patent is extended or adjusted under 35 U.S.C. 154(b) by 0 days.

(21) Appl. No.: 13/174,728

(22) Filed: Jun. 30, 2011

(65) Prior Publication Data

US 2011/0260103 A1 Oct. 27, 2011

Related U.S. Application Data

(63) Continuation of application No. PCT/CN2009/001595, filed on Dec. 30, 2009.

(30) Foreign Application Priority Data

| Dec. 30, 2008 | (CN) | 2008 1 0247535 |
| Dec. 30, 2008 | (CN) | 2008 1 0247537 |
| May 31, 2009 | (CN) | 2009 1 0086347 |
| May 31, 2009 | (CN) | 2009 1 086348 |

(51) Int. Cl.
*C01G 49/00* (2006.01)

(52) U.S. Cl.
USPC ............................ 423/632; 423/140; 423/144

(58) Field of Classification Search
USPC ........................... 423/632, 140–147; 106/456
See application file for complete search history.

(56) References Cited

U.S. PATENT DOCUMENTS

| 7,037,876 B2 | 5/2006 | O'Brien et al. |
| 7,717,979 B2 | 5/2010 | Liu et al. |
| 2005/0123470 A1 | 6/2005 | Ayyer et al. |
| 2005/0247636 A1 | 11/2005 | Schlegel |
| 2008/0047395 A1* | 2/2008 | Liu et al. .................. 75/319 |
| 2008/0241055 A1 | 10/2008 | Kawase et al. |
| 2009/0169470 A1* | 7/2009 | Kawase .................... 423/633 |

FOREIGN PATENT DOCUMENTS

| CN | 1121950 | 5/1996 |
| CN | 1133817 | 10/1996 |
| CN | 1034422 | 4/1997 |
| CN | 1312132 | 9/2001 |
| CN | 1368537 | 9/2002 |
| CN | 1114462 | 7/2003 |
| CN | 1136045 | 1/2004 |
| CN | 1539545 | 10/2004 |
| CN | 1704144 | 12/2005 |
| CN | 101070491 | 11/2007 |
| CN | 101584962 | 5/2008 |
| CN | 101585556 | 11/2009 |
| CN | 101585557 | 11/2009 |
| CN | 101767828 | 7/2010 |
| EP | 0215505 | 3/1987 |
| EP | 0628339 | 6/1994 |
| EP | 1857414 | 11/2007 |
| GB | 838571 | 6/1960 |
| JP | 59039345 | 3/1984 |
| JP | 6262066 | 9/1994 |
| JP | 10259026 | 9/1998 |
| WO | WO 2006088083 | 8/2006 |
| WO | WO 2009/150232 | 12/2009 |
| WO | WO 2010081290 | 7/2010 |

OTHER PUBLICATIONS

Gong Zhi-jian et al., "Research on Desulfurization Activity of Iron Oxyhydroxide Prepared with Different Alkali Ratios", *Coal Science and Technology*, 34(10): 44-46 (2006).
Gong Zhi-jian et al., "Research on Desulfurization Activity of Iron Oxide Hydroxides Prepared with Different Methods", *Coal Conversion*, 29 (3):71-74 (2006).
Liu and Liu, "The Characterization of an Active Components in a kind of Iron Oxides Desulfurizer with High Sulfur Capacity",National Information Center of Gas Purification Proceedings on Technical Seminar. 2006, pp. 107-111.
Office Action mailed May 3, 2012, for U.S. Appl. No. 13/172,893.
Response filed Nov. 5, 2012 for U.S. Appl. No. 13/172,893.
Final Office Action mailed Nov. 29, 2012 for U.S. Appl. No. 13/172,893.
Office Action mailed Aug. 16, 2012 for U.S. Appl. No. 13/172,898.
Office Action mailed Aug. 28, 2012 for U.S. Appl. No. 12/769,761.
Response filed Sep. 27, 2012 for U.S. Appl. No. 12/769,761.
Office Action mailed Oct. 12, 2012 for U.S. Appl. No. 12/769,761.
Response filed Feb. 12, 2013 for U.S. Appl. No. 12/769,761.

(Continued)

*Primary Examiner* — Steven Bos
(74) *Attorney, Agent, or Firm* — Womble Carlyle Sandridge & Rice LLP

(57) ABSTRACT

Methods for preparing a composition containing amorphous iron oxide hydroxide. Methods for regeneration of the amorphous iron oxide hydroxide after it has been used as desulfurizer. Regenerable desulfurizer with high sulfur capacity containing amorphous iron oxide hydroxide, not less than 88% w/w, and organic binder not less than 7% w/w. The organic binder is sodium carboxymethylcellulose, sesbania powder, cellulose powder, or a mixture thereof. A method for preparing the desulfurizer. A method for regenerating the waste agent produced after the desulfurizer and the composition containing the desulfurizer are used as desulfurizer. This method allows the desulfurizer and the composition containing the desulfurizer to be regenerated and reused avoiding the need for landfill disposal and environmental pollution.

11 Claims, No Drawings

(56) References Cited

OTHER PUBLICATIONS

Office Action mailed Jun. 29, 2012 for U.S. Appl. No. 13/174,743.
Response filed Jul. 29, 2012 for U.S. Appl. No. 13/174,743.
Office Action mailed Aug. 14, 2012 for U.S. Appl. No. 13/174,743.
Office Action mailed Mar. 31, 2009 for U.S. Appl. No. 11/805,727.
Response filed Jun. 30, 2009 for U.S. Appl. No. 11/805,727.
Final Office Action mailed Oct. 28, 2009 for U.S. Appl. No. 11/805,727.
Response to Final Office Action filed Dec. 14, 2009 for U.S. Appl. No. 11/805,727.
Notice of Allowance for U.S. Appl. No. 11/805,727 mailed Jan. 7, 2010.
Issue Fee Transmittal for U.S. Appl. No. 11/805,727, filed Apr. 7, 2010.
Issue Notification for U.S. Appl. No. 11/805,727, mailed Apr. 28, 2010.
Response filed Feb. 14, 2013 for U.S. Appl. No. 13/174,743.
Response filed Feb. 15, 2013 for U.S. Appl. No. 13/172,898.
Response filed Feb. 28, 2013 for U.S. Appl. No. 13/172,893.
Supplementary European Search Report and Search Opinion for EPO application No. 09845385.5, dated Nov. 5, 2012.
Eurasian Patent Office Action dated Feb. 15, 2013, for EA application No. 20117143.
Multiple-Site Adsorption of Cd, Cu, Zn, and Pb on Amorphous Iron Oxyhydroxide, Mark M. Benjamin and James O. Leckie, "Journal of Colloid and Interface Science,", vol. 79, No. 1, Jan. 1981.
European Extended Search Report for application No. PCT/CN2009001598, dated Jun. 25, 2012.
European Extended Search Report for application No. PCT/CN2009001597, dated May 28, 2012.
European Extended Search Report for application No. PCT/CN2009001596, dated Jun. 25, 2012.
European Extended Search Report for application No. PCT/CN2009001595, dated Jun. 25, 2012.
European Extended Search Report for application No. PCT/CN2009001594, dated Nov. 11, 2012.
Eurasian Patent Office Action dated Feb. 15, 2013, for EA application No. 201170905.
Eurasian Patent Office Action dated Mar. 21, 2013, for EA application No. 201170839.
Eurasian Patent Office Action dated Jan. 1.7, 2013, for EA application No. 201170904.
Eurasian Patent Office Action dated Jan. 17, 2013, for EA application No. 201170903.

* cited by examiner

METHODS FOR PREPARING AND REGENERATING MATERIALS CONTAINING AMORPHOUS IRON OXIDE HYDROXIDE AND DESULFURIZER COMPRISING THE SAME

CROSS-REFERENCE TO RELATED APPLICATIONS

This application is a continuation of International Patent Application No. PCT/CN2009/001595, with an international filing date of Dec. 30, 2009, designating the United States, now pending, and further claims priority benefits to Chinese Patent Application No. 200810247535.3, filed Dec. 30, 2008, Chinese Patent Application No. 200810247537.2, filed Dec. 30, 2008, Chinese Patent Application No. 200910086347.1, filed May 31, 2009, and Chinese Patent Application No. 200910086348.6, filed May 31, 2009. The contents of all of the aforementioned applications, including any intervening amendments thereto, are incorporated herein by reference.

BACKGROUND OF THE INVENTION

1. Field of the Invention

This invention relates to preparation method and regeneration method for composition comprising amorphous iron oxide hydroxide and preparation method and regeneration method for the desulfurizer containing the composition comprising amorphous iron oxide hydroxide, which belongs to desulfurizer technology field.

2. Description of the Related Art

Sulfide is produced in many industrial occasions, such as process of producing chemical raw materials from coal or oil, waste water or gas in the industrial emissions. Wherein, there are lots of sulfur-containing substances in the raw materials. And hydrogen sulfide can be discharged from these sulfur-containing substances during the process of production, so as to result in catalyst deactivation in the subsequent production. Also, hydrogen sulfides in the waste water or gas will cause environmental pollution, or poisoning of human and animal if discharged without any treatment.

In order to effectively reduce sulfide especially to minimize the effects of sulfide on the industrial production and the environment, researchers pay enough attention to the research and development of the desulfurizer. There are lots of desulfurizer for removal of hydrogen sulfide in the existing technologies, and a traditional and important one is the iron series desulfurizer which is produced by mainly using iron oxides as the active ingredients of the desulfurizer, wherein iron oxides includes ferroferric oxide, ferric oxide and iron oxide hydroxide (FeOOH). However, the iron series desulfurizer in the existing technologies has a shortcoming that sulfur capacity is not high enough.

In addition, the used desulfurizer in the existing technologies (including iron series desulfurizer) cannot be regenerated or is difficult to be regenerated, so that lots of waste agents have to be landfilled, and this may cause waste of reusable resources in used desulfurizer and environmental pollution.

Because of the good desulphurization property, iron oxide hydroxide is widely used as desulfurizer in chemical field. However, the preparation method for amorphous iron oxide hydroxide is a laboratory method, which needs to be protected with nitrogen and the method is relatively complicated. Therefore, it does not meet the requirements for mass production. In the existing technology, especially in the industrial application, there is very few desulfurizer of amorphous iron oxide hydroxide used. Even if there exists the desulfurizer of amorphous iron oxide hydroxide in the market, the content of amorphous iron oxide hydroxide is low (less than 40%), and the content of iron oxides which cannot be regenerated is high, such as ferroferric oxide, ferric oxide, or iron oxide hydroxide in other crystalline state. This causes poor desulfurization property of amorphous iron oxide desulfurizer, and further causes the desulfurizer not to be regenerable, or no use value even if it can be regenerated.

The objectives of this invention are to achieve the mass production of amorphous iron oxide hydroxide with high purity and sulfur capacity, and even regeneration of used amorphous iron oxide hydroxide in industrial production. If this two objectives can be achieved, it will be a significant revolution in the desulfurizer field and the two followed shortcomings of the existing desulfurizer can be eliminated. (1) Because the preparation of iron oxide hydroxide is closely related to the reaction conditions such as pH value, temperature, and oxide, iron oxides (such as ferroferric oxide, ferric oxide) or iron oxide hydroxide in different crystalline states can be obtained through different preparation methods. The content of amorphous iron oxide hydroxide in the product is low (lower than 40%) so the product has low sulfur capacity and cannot be regenerated. (2) In the existing technology, the other kinds of desulfurizers cannot be regenerated or the regeneration cost is very high, so lots of waste agent has to be landfilled, and this may cause waste of reusable resources in used desulfurizer and environmental pollution.

SUMMARY OF THE INVENTION

In view of the above-described problems, the content of amorphous iron oxide hydroxide is low in the generated substance in existing technology. It is one objective of this invention to provide a method for preparing a composition comprising highly concentrated amorphous iron oxide hydroxide that is suitable for mass production.

It is another objective of this invention to provide a method for regenerating the composition of the amorphous iron oxide hydroxide after being used as a desulfurizer.

In order to solve that the existing desulfurizer has low sulfur capacity and cannot regenerate or generate difficultly, another objective of the invention is to provide a desulfurizer that has a high sulfur capacity, can be product massively and regenerated.

An further objective of this invention is to provide a method for preparing the desulfurizer.

The final objective of this invention is to provide a method for regenerating the desulfurizer.

In order to achieve the above mentioned objectives, firstly, a material or composition comprising amorphous iron oxide hydroxide with high purity and sulfur capacity can be massively manufactured, and also the waste agent generated after the desulfurzier used should be quickly regenerated and the elemental sulfur generated during the process of regeneration can be recycled, finally, the material or composition regenerated after the elemental sulfur is removed can be used to produce a desulfurizer with high sulfur capacity.

In order to achieve the above mentioned objectives, this invention provides a method for preparing a composition comprising substance amorphous iron oxide hydroxide, the method comprising the following steps: (1) preparing a ferrous salt solution with a solid soluble ferrous salt; (2) mixing the ferrous salt solution in step (1) with soluble carbonate solution prepared or soluble bicarbonate solution prepared into a first mixture, allowing the first mixture to react to yield a second mixture; or mixing the soluble ferrous solution in step (1) with solid carbonate or solid bicarbonate into a first mixture, allowing the first mixture to react to yield a second mixture; (3) filtering the second mixture in step (2) to remove the generated soluble salt and yield a filter cake, and washing the filter cake with water; and (4) preparing the filter cake into a suspension, charging the suspension with a gas containing oxygen, then filtering the suspension and drying to yield a mixture containing amorphous iron oxide hydroxide.

The carbonate solid is sodium carbonate, ammonium carbonate, or potassium carbonate, and the bicarbonate solid is sodium bicarbonate, ammonium bicarbonate, or potassium bicarbonate in step (2).

The pH value of the solution in step (2) is between 7.5 and 8.5 at the end of reaction.

The filter cake is washed with water, allowing the weight proportion of $Na^+$, $K^+$, or $NH_4^+$ to be less than 0.5% in step (3).

The weight proportion of solid in the suspension prepared is between 5% and 30%, particularly 10-15% in step (4).

The drying temperature in step (4) does not exceed 100° C., particularly 80° C.-100° C.

The gas containing oxygen in step (4) is air.

Charging the suspension with a gas containing oxygen until the weight proportion between the ferrous ion and Ferrum element is less than 1% in step (4).

The weight proportion of amorphous iron oxide hydroxide in the composition is between 65% and 100%, and the other ingredients are water and byproduct after reaction.

A method for regenerating a composition used amorphous iron oxide hydroxide after the composition is used as a desulfurizer, the method comprising the following steps: (a) grinding a waste mixture into a waste powder, the waste mixture results from the use of the composition comprising amorphous iron oxide hydroxide as desulfurizer; (b) preparing the waste powder into a suspension and charging the suspension with a gas containing oxygen for oxidation to obtain a slurry comprising amorphous iron oxide hydroxide and elemental sulfur; and (c) filtering the slurry to yield a solid and extracting the elemental sulfur from the solid with a solvent to yield the composition comprising amorphous iron oxide hydroxide.

The principle of the desulfurization of amorphous iron oxide hydroxide and regeneration is:

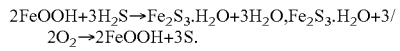

$2FeOOH+3H_2S \rightarrow Fe_2S_3.H_2O+3H_2O, Fe_2S_3.H_2O+3/2O_2 \rightarrow 2FeOOH+3S$.

Prior to grinding in step (a), the waste mixture is washed with water.

The extracted solution is concentrated to yield crystalline elemental sulfur in step (c).

The weight percent of the solid in the suspension is 5-30%, particularly 10-15% in step (b).

The gas containing oxygen is air in step (b).

The solvent is a non-polar solvent, either carbon tetrachloride or carbon disulfide in step (c).

The waste mixture is ground into particles of size 100-400 mesh, particularly 200 mesh in step (a).

A method for regenerating composition comprising amorphous iron oxide hydroxide after the composition is used as desulfurizer, the method comprising the following steps: (I) grinding a waste mixture into a waste powder, the waste mixture results from the use of the composition comprising amorphous iron oxide hydroxide as desulfurizer; (II) preparing the waste powder into a suspension and charging the suspension with a gas containing oxygen for oxidation to obtain a slurry comprising amorphous iron oxide hydroxide and elemental sulfur; and (III) placing the slurry or a solid resulting from filtering the slurry into a container and charging the slurry or the solid with air so that the elemental sulfur floats and the composition amorphous iron oxide hydroxide regenerated precipitates.

Prior to grinding in step (I), the waste mixture is washed with water.

The method further comprises separating the floated elemental sulfur after step (III).

The weight percent of solid in the suspension is 5-30%, particularly 10-15% in step (II).

The gas containing oxygen in step (II) is air.

An auxiliary agent is added to the reactor to accelerate the floatation of the elemental sulfur in step (III). The auxiliary agent is water glass and kerosene.

The reactor is a flotation tank in step (III).

The waste mixture is ground into particles of size 100-400 mesh, particularly 200 mesh in step (I).

In the amorphous iron oxide hydroxide, oxygen atoms are arranged in a cubic close-packed structure, and iron centers are arranged in a tetrahedral or octahedral cavity formed by the oxygen atoms. The two form a short-range ordered and long-range disordered structure that has good stability combining with sulfur atoms. The amorphous iron oxide hydroxide has a high sulfur capacity and good desulfurization properties.

A desulfurizer comprising a composition comprising amorphous iron oxide hydroxide and organic binder, wherein the desulfurizer includes the substance containing amorphous iron oxide hydroxide is prepared according to the following steps: (1) preparing a ferrous salt solution with a solid soluble ferrous salt; (2) mixing the ferrous salt solution in step (1) with soluble carbonate solution prepared or soluble bicarbonate solution prepared into a first mixture, allowing the first mixture to react to yield a second mixture; or mixing the soluble ferrous solution in step (1) with solid carbonate or solid bicarbonate into a first mixture, allowing the first mixture to react to yield a second mixture; (3) filtering the second mixture in step (2) to remove the generated soluble salt and yield a filter cake; and (4) charging the filter cake with a gas containing oxygen to yield the a mixture containing the amorphous iron oxide hydroxide.

The desulfurizer further comprising an additive.

The desulfurizer comprising 88-93 wt. % of the composition comprising amorphous iron oxide hydroxide and 7-12 wt. % of the organic binder.

The desulfurizer comprising 88-92 wt. % of the composition comprising amorphous iron oxide hydroxide, 7-12 wt. % of the organic binder, and 1-5 wt. % of the additive.

The organic binder is sodium carboxymethylcellulose, sesbania powder, cellulose powder, or a mixture thereof.

The additive is sawdust powder, rice hull powder, wheat bran powder, or a mixture thereof.

The carbonate solid is sodium carbonate, ammonium carbonate, or potassium carbonate, and the bicarbonate solid is sodium bicarbonate, ammonium bicarbonate, or potassium bicarbonate in step (2).

The pH value of the solution in step (2) is between 7.5 and 8.5 at the end of reaction.

In step (4), preparing the filter cake obtained after step (3) into suspension; then charging the suspension with air for oxidation, then filtering and drying the suspension to yield a mixture containing amorphous iron oxide hydroxide. In the step, the filter cake is washed with water, allowing the weight proportion of $Na^+$, $K^+$ or $NH_4^+$ to be less than 0.5%. The weight proportion of solid in the suspension prepared is between 5% and 30%, particularly 10-15%. Charging the suspension with air until the weight proportion between the ferrous ion and Ferrum element is less than 1%. The drying temperature does not exceed 100° C., particularly 80° C.-100° C.

In step (4), drying the filter cake obtained after step (3) in the air, then washing the filter cake with water, filtering and drying the filter cake to yield a mixture containing amorphous iron oxide hydroxide. Charging the suspension with air until the weight proportion between the ferrous ion and Ferrum element is less than 1%. The drying temperature does not exceed 100° C.

A method for preparing the desulfurizer, wherein, comprising the following steps: (A) mixing the composition containing amorphous iron oxide hydroxide with organic binder into a mixture, or mixing the composition containing amorphous iron oxide hydroxide with organic binder and addictive into a mixture; (B) shaping the mixture into a stripe, ball or a pill; and (C) naturally drying the strip, the ball, or the pill at room temperature between −5 and 45° C., or roasting the stripe, ball, or the pill at temperatures between 60° C. and 90° C. to yield the desulfurizer.

The principle of the desulfurization of amorphous iron oxide hydroxide and regeneration is:

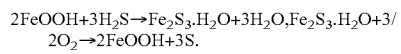

A method for regenerating the desulfurizer comprising the following steps: (I) grinding a waste mixture resulting from use of the desulfurizer into a waste powder; (II) preparing the waste powder into a suspension and charging the suspension with a gas containing oxygen for oxidation to obtain a slurry comprising amorphous iron oxide hydroxide and elemental sulfur; and (III) placing the slurry or a solid resulting from filtering the slurry into a reactor, charging the slurry with air whereby the elemental sulfur floats, and collecting a precipitate from the bottom of the reactor, adding the organic binder or the organic binder and an additive to the precipitate to yield the desulfurizer.

Prior to grinding in step (I), the waste mixture is washed with water.

Floating sulfur is separated after step (III).

The weight percentage of the solid in the suspension in step (II) is between 5% and 30%, particularly 10-15%.

The air containing oxygen is air in step (II).

In step (III), an auxiliary agent is added to the reactor to accelerate the floating of the elemental sulfur.

The reactor is a flotation tank in step (III).

In step (I), the waste mixture is ground into a powder with particle size of 100 to 400 mesh, particularly 200 mesh.

A method for regenerating the desulfurizer comprising the following steps: (a) grinding the waste mixture resulting from the use of the desulfurizer into a waste powder; (b) preparing the waste powder in a suspension and charging with a gas containing oxygen for oxidation to obtain a slurry comprising amorphous iron oxide hydroxide and elemental sulfur; and (c) filtering the slurry to yield a solid and extracting the elemental sulfur from the solid using a solvent; and adding the organic binder or the organic binder and the additive to the solid to yield the desulfurizer.

Prior to grinding in step (a), the waste mixture is washed with water. The extracted solution is concentrated to yield crystalline elemental sulfur in step (c). In step (b), the weight percent of the solid in the suspension is 5-30%, particularly 10-15%. The gas containing oxygen is air in step (b). In step (c), the solvent is a non-polar solvent, either carbon tetrachloride or carbon disulfide. In step (a), the waste mixture is ground into particles of size 100-400 mesh, particularly 200 mesh.

Comparing with existing technology, this invention has the following advantages:

1. The method for preparing composition containing amorphous iron oxide hydroxide can applied in mass production, not limited to laboratory. And the composition comprise highly concentrated amorphous iron oxide hydroxide (about 65-100%), which has high sulfur capacity (which may reach 62%). It solved the problem that there is no method for mass production generating amorphous iron oxide hydroxide with high purity and good desulfurization property steadily.
2. After the long term research, the applicant found that low temperature and fast oxidation speed is good for the generation of amorphous iron oxide hydroxide and but for ferroferric oxide or iron oxide hydroxide in other crystalline state. Amorphous iron oxide hydroxide is generated through the reaction of soluble ferrous salt solution and carbonate solid or bicarbonate solid in this invention. Because the reaction performs without releasing any heat, belonging to the room temperature reaction. so that no temperature control is needed to help with the generation of amorphous iron oxide hydroxide. In addition, after the reaction between soluble ferrous salt solution and carbonate solid or bicarbonate solid, the obtained substance is filtered to remove the generated soluble salts such as sodium sulfate, sodium chloride and potassium chloride. The objective of this process is to avoid the generation of iron oxide hydroxide in other crystalline state, because of low solubility of oxygen in the suspension when air is fed into the suspension. The preparation method in this invention ensures amorphous iron oxide hydroxide is generated rather than other iron oxides such as iron oxide hydroxide in other crystalline state, ferroferric oxide or ferric oxide, so as to improve the stability of generating amorphous iron oxide hydroxide.
3. In the preparation methods of this invention, filter cake is prepared into suspension and oxidized by air. The advantage is that the oxidation process can be controlled and good effect of oxidation can be obtained. In addition, the weight proportion of solid in the suspension is preferably 10-15%. The oxidation speed is very fast and the substance can be oxidized completely.
4. In the preparation method of this invention, the pH value of the solution at the end of reaction is controlled at 7.5-8.5 and preferably 8. Therefore, the ferrous in the solution can precipitate completely, and the ferrous can be oxidized into ferric easily rather than ferroferric oxide.
5. In the preparation method of this invention, the drying temperature is controlled not exceeding 100° C., avoiding generation more ferric oxide at high temperature.
6. For the composition comprising amorphous iron oxide hydroxide generated in this invention and two regeneration methods of this invention, the composition can be regenerated very fast after being used as a desulfurizer. The regenerated product still has high sulfur capacity. The regenerated product can be regenerated again to form a recycling, so that it saves resources, and reduces the pollution of waste agent not reusable to the environment, so that it may have great economic significance.
7. In the two regeneration methods of this invention, both regenerated amorphous iron oxide hydroxide and crystallized sulfur are obtained to optimize resource utilization.

8. Washing the waste mixture with water prior to grinding can effectively remove impurities that cover the surface of the waste mixture so as not to affect the subsequent reaction.
9. In the two regeneration methods of this invention, the waste agent powder is prepared into suspension and then oxidized with gas containing oxygen. The advantage is the oxidation process can be controlled and good effect of oxidation can be obtained. In addition, the weight proportion of solid in the suspension is preferably 10-15%. The oxidation speed is very fast and the substance can be oxidized completely. The weight proportion of the solid in the suspension is preferably to 10-15%, and this may ensure the oxidation can perform quickly, and the composition can be oxidized completely.
10. The separation of amorphous iron oxide hydroxide from elemental sulfur by flotation is achieved by charging the slurry with air and is purely a physical method. This method is economical and environmentally friendly.
11. The waste mixture is ground into particles of size 100-400 mesh (particularly 200 mesh), which improves oxidation, extraction, and flotation separation.
12. In the preparation method for substance containing amorphous iron oxide hydroxide, placing the filtered cake in the air for natural oxidation, can reduce the cost.
13. The desulfurizer in this invention includes the substance containing amorphous iron oxide hydroxide and organic binder, wherein, the substance containing amorphous iron oxide hydroxide prepared by the method has high sulfur capacity (in anaerobic conditions, one-time penetrating sulfur capacity can achieve 56%) and also can be regenerated easily.
14. The desulfurizer can optionally comprise an additive selected from the following: sawdust powder, rice hull powder, wheat bran powder, or a mixture thereof, so that the desulfurizer has a loose structure and absorbs sulfide easily.
15. The organic binder includes one or more of sodium carboxymethylcellulose, sesbania powder, cellulose powder. These binders could not cover the surface of amorphous iron oxide hydroxide substance, so these would not influence the desulfurization activity so as to make sure the desulfurizer has high sulfur capacity.
16. The substance containing amorphous iron oxide hydroxide prepared by the method in this invention also can be applied to other fields besides desulfurizer field.

DETAILED DESCRIPTION OF THE EMBODIMENTS

The following implementation examples give a further detailed description of this invention, but are not a limitation of this invention.

EXAMPLE 1

The process for preparing the composition containing amorphous iron oxide hydroxide comprises the following steps:
152 g solid $FeSO_4$ was prepared into solution and placed in reaction tank and then 58 g solid $Na_2CO_3$ was put into the reaction tank and the mixture was stirred simultaneously until the pH value of mixed solution reached 8. After 0.5 h, the solution was filtered and filter cake was washed until the weight proportion of $Na^+$ in the filter cake less than 0.5%. The filter cake was prepared into suspension, in which the weight proportion of solid is 30%. Then air was fed into the suspension for oxidation until the weight proportion of $Fe^{2+}/Fe_t$ less than 1%. Then the solution was filtered and the resultant solid was dried at 100° C. to yield a composition comprising amorphous iron oxide hydroxide. In the composition, the weight percentage of amorphous iron oxide hydroxide was 85% and the other ingredients were $NaSO_4$, water, and $TiO_2$ ($TiO_2$ is impurity in $FeSO_4$, the following examples are the same), with a sulfur capacity of 53%.

$Fe_t$ in this example is the total content of Ferrum element. $Fe^{2+}/Fe_t$ was analysed through phenanthroline spectrophotometry. The content of $Na^+$ was analysed through flame spectrometry. The following examples are the same.

The process of method 1 for regeneration the composition after being used for desulfurization is described below:

The composition was added The composition was added to a desulfurization reactor After $H_2S$ passing through the reactor, the resultant waste mixture was unloaded, washed with water and ground in the presence of water using a wet ball mill into powders of particle size 100 mesh. An aqueous suspension of the powders was prepared with a solid weight percentage of 5%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 51%. After second, third, and fourth rounds of regeneration, the composition had a sulfur capacity of 48%, 46%, and 44%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 100 mesh. An aqueous suspension of the powders was prepared with a solid weight percentage of 5%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was added to a flotation tank. Water was further added, and air was charged into the slurry. Due to hydrophobicity, the elemental sulfur was removed by overflowing the tank. The precipitate at the bottom of the tank was a composition comprising amorphous iron oxide hydroxide. The elemental sulfur was refined through extraction or other methods. The composition was roasted and could be reused as a desulfurizer. The composition had a sulfur capacity of 52%. After second, third, and fourth rounds of regeneration, the composition had a sulfur capacity of 50%, 48%, and 46%, respectively.

EXAMPLE 2

The process for preparing the composition containing amorphous iron oxide hydroxide comprises the following steps:

127 g solid $FeCl_2$ was prepared into solution and placed in reaction tank and then 88 g solid $K_2CO_3$ was further put into the reaction tank, and the mixture was stirred simultaneously until the pH value of mixed solution reached 8. After 1 h, the solution was filtered and filter cake was washed until the weight proportion of $K^+$ in the filter cake less than 0.5%. The filter cake was prepared into suspension, in which the weight proportion of solid is 15%. Then air was fed into the suspension for oxidation until the weight proportion of $Fe^{2+}/Fe_t$ less than 1%. Then the solution was filtered and the resultant solid was dried at 90° C. to yield a composition comprising amorphous iron oxide hydroxide. In the composition, the weight percentage of amorphous iron oxide hydroxide was 80% and the other ingredients were KCl, water, $Fe_3O_4$, and impurity unknown, with a sulfur capacity of 49.6%.

The content of $K^+$ was analysed through flame spectrometry. The following examples are the same.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percentage of 10%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising regenerated amorphous iron oxide hydroxide. The composition was roasted and could be reused as a desulfurizer. The composition had a sulfur capacity of 48%. After second, third, and fourth rounds of regeneration, the composition had a sulfur capacity of 46%, 44.5%, and 42%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 200 mesh. An aqueous suspension of the powders was prepared with a solid weight percentage of 10%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 48%. After second, third, and fourth rounds of regeneration, the composition had a sulfur capacity of 46.5%, 45%, and 44%, respectively.

The auxiliary agent is helpful with the separation of amorphous iron oxide hydroxide and elemental sulfur, the following examples are the same.

EXAMPLE 3

The process for preparing the composition containing amorphous iron oxide hydroxide comprises the following steps:

152 g solid $FeSO_4 \cdot 7H_2O$ was prepared into solution and placed in reaction tank and then 92 g solid $NaHCO_3$ was put into the reaction tank and the mixture was stirred simultaneously until the pH value of mixed solution reached 8. After 0.5 hour, the solution was filtered and filter cake was washed until the weight proportion of $Na^+$ in the filter cake less than 0.5%. The filter cake was prepared into suspension, in which the weight proportion of solid is 30%. Then air was fed into the suspension for oxidation until the weight proportion of $Fe^{2+}/Fe_t$ less than 1%. Then the solution was filtered and the resultant solid was dried at 45° C. to yield a composition comprising amorphous iron oxide hydroxide. In the composition, the weight percentage of amorphous iron oxide hydroxide was 80% and the other ingredients were $Na_2SO_4$, water, and $TiO_2$, with a sulfur capacity of 49.6%.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 100 mesh. An aqueous suspension of the powders was prepared with a solid weight percentage of 5%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising regenerated amorphous iron oxide hydroxide. The composition was roasted and could be reused as a desulfurizer. The composition had a sulfur capacity of 48.3%. After second, third, and fourth rounds of regeneration, the composition had a sulfur capacity of 44.6%, 42.8%, and 41.2%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 100 mesh. An aqueous suspension of the powders was prepared with a solid weight percentage of 5%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and air was charged into the slurry. Due to hydrophobicity, the elemental sulfur was removed by overflowing the tank. The precipitate at the bottom of the tank was a composition comprising amorphous iron oxide hydroxide. The elemental sulfur was refined through extraction or other methods. The composition was roasted and could be reused as a desulfurizer. The composition had a sulfur capacity of 47.8%. After second, third, and fourth rounds of regeneration, the composition had a sulfur capacity of 44.2%, 42.8%, and 41.2%, respectively.

EXAMPLE 4

The process for preparing the composition containing amorphous iron oxide hydroxide comprises the following steps:

127 g solid $FeCl_2.4H_2O$ was prepared into solution and placed in reaction tank and then 128 g solid $KHCO_3$ was put into the reaction tank and the mixture was stirred simultaneously until the pH value of mixed solution reached 8. After 1.5 h, the solution was filtered and filter cake was washed until the weight proportion of $K^+$ in the filter cake less than 0.5%. The filter cake was prepared into suspension, in which the weight proportion of solid is 10%. Then air was fed into the suspension for oxidation until the weight proportion of $Fe^{2+}/Fe_t$ less than 1%. Then the solution was filtered and the resultant solid was dried at 30° C. to yield a composition comprising amorphous iron oxide hydroxide. In the composition, the weight percentage of amorphous iron oxide hydroxide was 88% and the other ingredients were KCl, water, and impurity unknown, with a sulfur capacity of 54.6%.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percentage of 10%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising regenerated amorphous iron oxide hydroxide. The composition was roasted and could be reused as a desulfurizer. The composition had a sulfur capacity of 52.9%. After second, third, and fourth rounds of regeneration, the composition had a sulfur capacity of 49.4%, 48.1%, and 46.3%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 200 mesh. An aqueous suspension of the powders was prepared with a solid weight percentage of 10%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was added to a flotation tank. Water was added, and water glass and kerosene were added as auxiliary agents, and air charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 52.6%. After second, third, and fourth rounds of regeneration, the composition had a sulfur capacity of 48.8%, 47.0%, and 45.2%, respectively.

EXAMPLE 5

The process for preparing the composition containing amorphous iron oxide hydroxide comprises the following steps:

Solid $Fe(NO_3)_2.6H_2O$ was prepared into solution and placed in reaction tank and then solid $(NH_4)_2CO_3$ was put into the reaction tank and the mixture was stirred simultaneously. The pH value of mixed solution reached 7.5 at the end of reaction. The solution was filtered and filter cake was washed until the weight proportion of $NH_4^+$ in the filter cake less than 0.5%. The filter cake was prepared into suspension, in which the weight proportion of solid is 10%. Then air was fed into the suspension for oxidation until the weight proportion of $Fe^{2+}/Fe_t$ less than 1%. Then the solution was filtered and the resultant solid was dried at 80° C. to yield a composition comprising amorphous iron oxide hydroxide. In the composition, the weight percentage of amorphous iron oxide hydroxide was 100%, with a sulfur capacity of 62%. The content of $NH_4^+$ was analysed through Nessler's reagent.

The content of $(NH_4)_2CO_3$ solid or the ratio of two materials was controlled through controlling the pH value of solution in this example. The following examples are the same.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 300 mesh. An aqueous suspension of the powders was prepared with a solid weight percentage of 15%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 300 mesh. An aqueous suspension of the powders was prepared with a solid weight percentage of 15%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

EXAMPLE 6

The process for preparing the composition containing amorphous iron oxide hydroxide comprises the following steps:

Solid $FeCl_2 \cdot 4H_2O$ was prepared into solution and placed in reaction tank and then solid $NaHCO_3$ was put into the reaction tank and the mixture was stirred simultaneously. The pH value of mixed solution reached 8 at the end of reaction. The solution was filtered and filter cake was washed until the weight proportion of $Na^+$ in the filter cake less than 0.5%. The filter cake was prepared into suspension, in which the weight proportion of solid is 5%. Then air was fed into the suspension for oxidation until the weight proportion of $Fe^{2+}/Fe_t$ less than 1%. Then the solution was filtered and the resultant solid was dried at 70° C. to yield a composition comprising amorphous iron oxide hydroxide. In the composition, the weight percentage of amorphous iron oxide hydroxide was 92%, and the other ingredients were NaCl, water, and impurity unknown, with a sulfur capacity of 57%. The content of $Cl^-$ was analysed through mercuric thiocyanate colorimetry.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 400 mesh. An aqueous suspension of the powders was prepared with a solid weight percentage of 30%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising regenerated amorphous iron oxide hydroxide. The composition was roasted and could be reused as a desulfurizer. The composition had a sulfur capacity of 55%. After second, third, and fourth rounds of regeneration, the composition had a sulfur capacity of 53%, 50%, and 48%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 400 mesh. An aqueous suspension of the powders was prepared with a solid weight percentage of 30%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 55%. After second, third, and fourth rounds of regeneration, the composition had a sulfur capacity of 54%, 52%, and 50%, respectively.

EXAMPLE 7

The process for preparing the composition containing amorphous iron oxide hydroxide comprises the following steps:

Solid $FeSO_4 \cdot 7H_2O$ was prepared into solution and placed in reaction tank and then solid $KHCO_3$ was put into the reaction tank and the mixture was stirred simultaneously. The pH value of mixed solution reached 8.5 at the end of reaction. The solution was filtered and filter cake was washed until the weight proportion of $K^+$ in the filter cake less than 0.5%. The filter cake was prepared into suspension, in which the weight proportion of solid is 5%. Then air was fed into the suspension for oxidation until the weight proportion of $Fe^{2+}/Fe_t$ less than 1%. Then the solution was filtered and the resultant solid was dried at 60° C. to yield a composition comprising amorphous iron oxide hydroxide. In the composition, the weight percentage of amorphous iron oxide hydroxide was 90%, and the other ingredients were $K_2SO_4$, $TiO_2$, and water, with a sulfur capacity of 55.8%.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with particle size of 400 mesh. An aqueous suspension of the powders was prepared with a solid weight percentage of 10%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 54%. After second, third, and fourth rounds of regeneration, the composition had a sulfur capacity of 50.8%, 48%, and 46%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 400 mesh. An aqueous suspension of the powders was prepared with a solid weight percentage of 30%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 54%. After second, third, and fourth rounds of regeneration, the composition had a sulfur capacity of 51%, 49%, and 48%, respectively.

EXAMPLE 8

The process for preparing the composition containing amorphous iron oxide hydroxide comprises the following steps:

Solid $FeSO_4.7H_2O$ was prepared into solution and placed in reaction tank and then solid $NH_4HCO_3$ was put into the reaction tank and the mixture was stirred simultaneously. The pH value of mixed solution reached 8 at the end of reaction. The solution was filtered and filter cake was washed until the weight proportion of $NH_4^+$ in the filter cake less than 0.5%. The filter cake was prepared into suspension, in which the weight proportion of solid is 15%. Then air was fed into the suspension for oxidation until the weight proportion of $Fe^{2+}/Fe_t$ less than 1%. Then the solution was filtered and the resultant solid was dried at −5° C. to yield a composition comprising amorphous iron oxide hydroxide. In the composition, the weight percentage of amorphous iron oxide hydroxide was 80%, and the other ingredients were $(NH_4)_2SO_4$, $TiO_2$, water, and $Fe_3O_4$, with a sulfur capacity of 49.6%.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 400 mesh. An aqueous suspension of the powders was prepared with a solid weight percentage of 10%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 48.1%. After second, third, and fourth rounds of regeneration, the composition had a sulfur capacity of 44.3%, 42.5%, and 41.0%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 400 mesh. An aqueous suspension of the powders was prepared with a solid weight percentage of 30%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 47.9%. After second, third, and fourth rounds of regeneration, the composition had a sulfur capacity of 44.5%, 42.7%, and 41.2%, respectively.

EXAMPLE 9

The process for preparing the composition containing amorphous iron oxide hydroxide comprises the following steps:

152 g solid $FeSO_4.7H_2O$ was prepared into solution and placed in reaction tank and then a solution prepared with 58 g solid $Na_2CO_3$ was put into the reaction tank and the mixture was stirred simultaneously, until the pH value of mixed solution reached 8. After 0.5 h, the solution was filtered and filter cake was washed until the weight proportion of $Na^+$ in the filter cake less than 0.5%. The filter cake was prepared into suspension, in which the weight proportion of solid is 30%. Then air was fed into the suspension for oxidation until the weight proportion of $Fe^{2+}/Fe_t$ less than 1%. Then the solution was filtered and the resultant solid was dried at 100° C. to yield a composition comprising amorphous iron oxide hydroxide. In the composition, the weight percentage of amorphous iron oxide hydroxide was 85% and the other ingredients were $NaSO_4$, water, and $TiO_2$ ($TiO_2$ is impurity in $FeSO_4.7H_2O$, the following examples are the same), with a sulfur capacity of 53%.

$Fe_t$ in this example is the total content of Ferrum element. $Fe^{2+}/Fe_t$ was analysed through phenanthroline spectrophotometry. The content of $Na^+$ was analysed through flame spectrometry. The following examples are the same.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 100 mesh. An aqueous suspension of the powders was prepared with a solid weight percentage of 5%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 51%. After second, third, and fourth rounds of regeneration, the composition had a sulfur capacity of 48%, 46%, and 44%, respectively.

The process of method 2 for regeneration the composition after being used for desulfurization is described below:

The composition was added to a desulfurization reactor. After passing $H_2S$ through the reactor, the resultant waste mixture was unloaded, washed with water and ground in the presence of water using a wet ball mill into powders with a particle size of 100 mesh. An aqueous suspension of the powders was prepared with a solid weight percentage of 5%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was added to a flotation tank. Water was added, and air was charged into the slurry. Due to hydrophobicity, the elemental sulfur was removed by overflowing the tank. The precipitate at the bottom of the tank was a composition comprising amorphous iron oxide hydroxide. The elemental sulfur was refined through extraction or other methods. The composition was roasted and could be reused as a desulfurizer. The composition had a sulfur capacity of 52%. After second, third, and fourth rounds of regeneration, the composition had a sulfur capacity of 50%, 48%, and 46%, respectively.

EXAMPLE 10

The process for preparing the composition containing amorphous iron oxide hydroxide comprises the following steps:

88 g solid $K_2CO_3$ was prepared into solution and placed in reaction tank and then a solution prepared with 127 g solid $FeCl_2$ was put into the reaction tank and the mixture was stirred simultaneously, until the pH value of mixed solution reached 8.0. After 0.5 h, the solution was filtered and filter cake was washed until the weight proportion of $K^+$ in the filter cake less than 0.5%. The filter cake was prepared into suspension, in which the weight proportion of solid is 15%. Then air was fed into the suspension for oxidation until the weight proportion of $Fe^{2+}/Fe_t$ less than 1%. Then the solution was filtered and the resultant solid was dried at 90° C. to yield a composition comprising amorphous iron oxide hydroxide. In the composition, the weight percentage of amorphous iron oxide hydroxide was 81% and the other ingredients were KCl, water, $Fe_3O_4$, and impurity unknown, with a sulfur capacity of 50.2%.

The content of $K^+$ was analysed through flame spectrometry. The following examples are the same.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percentage of 10%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 48%. After second, third, and fourth rounds of regeneration, the composition had a sulfur capacity of 46%, 44.5%, and 42%, respectively.

The process of method 2 for regeneration the composition after being used for desulfurization is described below:

The composition was added to a desulfurization reactor. After passing $H_2S$ through the reactor, the resultant waste mixture was unloaded, washed with water and ground in the presence of water using a wet ball mill into powders with a particle size of 200 mesh. An aqueous suspension of the powders was prepared with a solid weight percentage of 10%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 48%. After second, third, and fourth rounds of regeneration, the composition had a sulfur capacity of 46.5%, 45%, and 44%, respectively.

The auxiliary agent is helpful with flotation of elemental sulfur, making separation of amorphous iron oxide hydroxide and elemental sulfur well. The following example is the same.

EXAMPLE 11

The process for preparing the composition containing amorphous iron oxide hydroxide comprises the following steps:

152 g solid $FeSO_4.7H_2O$ was prepared into solution and placed in reaction tank and then a solution prepared with 92 g solid $NaHCO_3$ was put into the reaction tank and the mixture was stirred simultaneously, until the pH value of mixed solution reached 8.5. After 0.5 h, the solution was filtered and filter cake was washed until the weight proportion of $Na^+$ in the filter cake less than 0.5%. The filter cake was prepared into suspension, in which the weight proportion of solid is 30%. Then air was fed into the suspension for oxidation until the weight proportion of $Fe^{2+}/Fe_t$ less than 1%. Then the solution was filtered and the resultant solid was dried at 45° C. to yield a composition comprising amorphous iron oxide hydroxide. In the composition, the weight percentage of amorphous iron oxide hydroxide was 80% and the other ingredients were $Na_2SO_4$, water, and $TiO_2$, with a sulfur capacity of 49.6%.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 100 mesh. An aqueous suspension of the powders was prepared with a solid weight percentage of 5%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 48.5%. After second, third, and fourth rounds of regeneration, the composition had a sulfur capacity of 46.0%, 44.8%, and 42.4%, respectively.

The process of method 2 for regeneration the composition after being used for desulfurization is described below:

The composition was added to a desulfurization reactor. After $_{H2}S$ passing through the reactor, the resultant waste mixture was unloaded, washed with water and ground in the presence of water using a wet ball mill into powders with a particle size of 100 mesh. An aqueous suspension of the powders was prepared with a solid weight percentage of 5%, compressed air was charged into the suspension, and a sample was collected for testing after a period of reaction. When no $_{H2}S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and air was charged into the slurry. Due to hydrophobicity, the elemental sulfur was removed by overflowing the tank. The precipitate at the bottom of the tank was a composition comprising amorphous iron oxide hydroxide. The elemental sulfur was refined through extraction or other methods. The composition was roasted and could be reused as a desulfurizer. The composition had a sulfur capacity of 48.0%. After second, third, and fourth rounds of regeneration, the composition had a sulfur capacity of 44.5%, 43.1%, and 42.4%, respectively.

EXAMPLE 12

The process for preparing the composition containing amorphous iron oxide hydroxide comprises the following steps:

128 g solid $KHCO_3$ was prepared into solution and placed in reaction tank and then a solution prepared with 127 g solid $FeCl_2$ was put into the reaction tank and the mixture was stirred simultaneously, until the pH value of mixed solution reached 8.0. After 1.5 h, the solution was filtered and filter cake was washed until the weight proportion of $K^+$ in the filter cake less than 0.5%. The filter cake was prepared into suspension, in which the weight proportion of solid is 10%. Then air was fed into the suspension for oxidation until the weight proportion of $Fe^{2+}/Fe_t$ less than 1%. Then the solution was filtered and the resultant solid was dried at 30° C. to yield a composition comprising amorphous iron oxide hydroxide. In the composition, the weight percentage of amorphous iron oxide hydroxide was 88% and the other ingredients were KCl, water and impurity unknown, with a sulfur capacity of 54.6%.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percentage of 10%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 52.8%. After second, third, and fourth rounds of regeneration, the composition had a sulfur capacity of 49.2%, 47.9%, and 46.0%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 200 mesh. An aqueous suspension of the powders was prepared with a solid weight percentage of 10%, compressed air was charged into the suspension, and a sample was collected for testing after a period of reaction. When no $_{H2}S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 52.8%. After second, third, and fourth rounds of regeneration, the composition had a sulfur capacity of 49.0%, 47.8%, and 45.8%, respectively.

EXAMPLE 13

The process for preparing the composition containing amorphous iron oxide hydroxide comprises the following steps:

Solid $Fe(NO_3)_2$ was prepared into solution and placed in reaction tank and then a solution prepared with solid $(NH_4)_2CO_3$ was put into the reaction tank and the mixture was stirred simultaneously. The pH value of mixed solution reached 7.5 at the end of reaction. The solution was filtered and filter cake was washed until the weight proportion of $NH_4^+$ in the filter cake less than 0.5%. The filter cake was prepared into suspension, in which the weight proportion of solid is 10%. Then air was fed into the suspension for oxidation until the weight proportion of $Fe^{2+}/Fe_t$ less than 1%. Then the solution was filtered and the resultant solid was dried at 80° C. to yield a composition comprising amorphous iron oxide hydroxide. In the composition, the weight percentage of amorphous iron oxide hydroxide was 100%, with a sulfur capacity of 62%. The content of $NH_4^+$ was analysed through Nessler's reagent.

The content of $(NH_4)_2CO_3$ solid or the ratio of two materials is controlled through controlling the pH value of solution in this example. The following examples are the same.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 300 mesh. An aqueous suspension of the powders was prepared with a solid weight percentage of 15%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 300 mesh. An aqueous suspension of the powders was prepared with a solid weight percentage of 15%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 59%. After second, third, and fourth rounds of regeneration, the composition had a sulfur capacity of 58%, 56%, and 54%, respectively.

EXAMPLE 14

The process for preparing the composition containing amorphous iron oxide hydroxide comprises the following steps:

Solid $NaHCO_3$ was prepared into solution and placed in reaction tank and then a solution prepared with solid $FeCl_2$ was put into the reaction tank and the mixture was stirred simultaneously. The pH value of mixed solution reached 8 at the end of reaction. The solution was filtered and filter cake was washed until the weight proportion of $Na^+$ in the filter cake less than 0.5%. The filter cake was prepared into suspension, in which the weight proportion of solid is 5%. Then air was fed into the suspension for oxidation until the weight proportion of $Fe^{2+}/Fe_t$ less than 1%. Then the solution was filtered and the resultant solid was dried at 70° C. to yield a composition comprising amorphous iron oxide hydroxide. In the composition, the weight percentage of amorphous iron oxide hydroxide was 92%, and the other ingredients were NaCl, water and impurity unknown, with a sulfur capacity of 57%. The content of $Cl^-$ was analysed through mercuric thiocyanate colorimetry.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 400 mesh. An aqueous suspension of the powders was prepared with a solid weight percentage of 30%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 55%. After second, third, and fourth rounds of regeneration, the composition had a sulfur capacity of 53%, 50%, and 48%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 400 mesh. An aqueous suspension of the powders was prepared with a solid weight percentage of 30%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 55%. After second, third, and fourth rounds of regeneration, the composition had a sulfur capacity of 54%, 52%, and 50%, respectively.

EXAMPLE 15

The process for preparing the composition containing amorphous iron oxide hydroxide comprises the following steps:

Solid $FeSO_4.7H_2O$ was prepared into solution and then mixed with $KHCO_3$ solution flowing together. The mixed solution was reacted in reaction tank. The pH value of mixed solution reached 8.5 at the end of reaction. The solution was filtered and filter cake was washed until the weight proportion of $K^+$ in the filter cake less than 0.5%. The filter cake was prepared into suspension, in which the weight proportion of solid is 5%. Then air was fed into the suspension for oxidation until the weight proportion of $Fe^{2+}/Fe_t$ less than 1%. Then the solution was filtered and the resultant solid was dried at 60° C.

to yield a composition comprising amorphous iron oxide hydroxide. In the composition, the weight percentage of amorphous iron oxide hydroxide was 89%, and the other ingredients were $K_2SO_4$, water, and impurity unknown, with a sulfur capacity of 55%.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 400 mesh. An aqueous suspension of the powders was prepared with a solid weight percentage of 10%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 53%. After second, third, and fourth rounds of regeneration, the composition had a sulfur capacity of 51%, 48%, and 46%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 400 mesh. An aqueous suspension of the powders was prepared with a solid weight percentage of 30%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 53%. After second, third, and fourth rounds of regeneration, the composition had a sulfur capacity of 51%, 49%, and 48%, respectively.

EXAMPLE 16

The process for preparing the composition containing amorphous iron oxide hydroxide comprises the following steps:

Solid $FeSO_4.7H_2O$ was prepared into solution and the mixed with $NH_4HCO_3$ solution flowing together. The mixed solution was reacted in reaction tank. The pH value of mixed solution reached 8 at the end of reaction. The solution was filtered and filter cake was washed until the weight proportion of $NH_4^+$ in the filter cake less than 0.5%. The filter cake was prepared into suspension, in which the weight proportion of solid is 15%. Then air was fed into the suspension for oxidation until the weight proportion of $Fe^{2+}/Fe_t$ less than 1%. Then the solution was filtered and the resultant solid was dried at −5° C. to yield a composition comprising amorphous iron oxide hydroxide. In the composition, the weight percentage of amorphous iron oxide hydroxide was 80%, and the other ingredients were $(NH_4)_2SO_4$, water, and $Fe_3O_4$, with a sulfur capacity of 49.6%.

The process of method 1 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders of particle size 400 mesh. An aqueous suspension of the powders was prepared with a solid weight percentage of 10%. Compressed air was charged into the suspension and a sample was collected for testing after a period of reaction. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 48.1%. After second, third, and fourth rounds of regeneration, the composition had a sulfur capacity of 44.3%, 42.5%, and 41.0%, respectively.

The process of method 2 for regeneration the composition after being used for desulfurization is described below:

The composition was added to a desulfurization reactor. After $H_2S$ passing through the reactor, the resultant waste mixture was unloaded, washed with water and ground in the presence of water using a wet ball mill into powders with a particle size of 400 mesh. An aqueous suspension of the powders was prepared with a solid weight percentage of 30%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was added to a flotation tank. Water was added, and water glass and kerosene were further added as auxiliary agents, and air was charged into the slurry. Due to hydrophobicity, the elemental sulfur was removed by overflowing the tank. The precipitate at the bottom of the tank was a composition comprising amorphous iron oxide hydroxide. The composition was roasted and could be reused as a desulfurizer. The composition had a sulfur capacity of 47.9%. After second, third, and fourth rounds of regeneration, the composition had a sulfur capacity of 44.5%, 42.7%, and 41.2%, respectively.

EXAMPLE 17

The process for preparing the composition containing amorphous iron oxide hydroxide comprises the following steps:

3040 g solid $FeSO_4.7H_2O$ was prepared into solution and placed in reaction tank and then a solution prepared with 1160 g solid $Na_2CO_3$ was put into the reaction tank and the mixture was stirred simultaneously. The pH value of mixed solution reached 8 at the end of reaction. After 0.5 h, the solution was filtered and filter cake was washed until the weight proportion of Na$^+$ in the filter cake less than 0.5%. The filter cake was prepared into suspension, in which the weight proportion of solid is 30%. Then air was fed into the suspension for oxidation until the weight proportion of Fe$^{2+}$/Fe$_t$ less than 1%. Then the solution was filtered and the resultant solid was dried at 100° C. to yield a composition comprising amorphous iron oxide hydroxide. In the composition, the weight percentage of amorphous iron oxide hydroxide was 85% and the other ingredients were NaSO$_4$, water, and TiO$_2$ (TiO$_2$ is impurity in FeSO$_4$, the following examples are the same), with a sulfur capacity of 53%.

Fe$_t$ in this example is the total content of Ferrum element. Fe$^{2+}$/Fe$_t$ was analysed through phenanthroline spectrophotometry. The content of Na$^+$ was analysed through flame spectrometry. The weight percentage of amorphous iron oxide hydroxide in the composition was analysed through the titanium trichloride-potassium dichromate volumetric method, and this method is one of the National Standards (GB6730.5-86) for analyzing the Iron ore. The following examples are the same.

The processes for preparation and regeneration of the desulfurizer are described below:

500 g composition comprising amorphous iron oxide hydroxide with a particle size of 100 mesh, 40 g sesbania powder and 10 g sawdust were mixed uniformly, kneaded with appropriate quantities of water using a small kneader, and extruded using a small twin screw extruder to yield a strip. The desulfurizer was roasted at 70° C. for 6 h, and the sulfur capacity thereof was measured to be 50%. The desulfurizer was named desulfurizer A.

The desulfurizer A was added to a desulfurization reactor. After H$_2$S passing through the reactor, the resultant waste mixture was unloaded, washed with water and ground in the presence of water using a wet ball mill into powders of particle size 100 mesh. An aqueous suspension of the powders was prepared with a solid weight percentage of 10%. Compressed air was charged into the slurry and a sample was collected for testing after a period of reaction. When no H$_2$S was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank, water was added, and air was charged. The elemental sulfur, additive and binder were removed, together with excess air, by overflowing the tank. The precipitate at the bottom of the tank was a composition comprising amorphous iron oxide hydroxide. The elemental sulfur was refined through extraction or other methods. The composition comprising amorphous iron oxide hydroxide was roasted at 80° C., and sesbania powder and sawdust were added according to the proportions described above. The mixture was treated in accordance with the method and reaction conditions described above to yield a new desulfurizer (desulfurizer B) with a sulfur capacity of 48%.

The desulfurizer B was used to desulfurize and was regenerated according to the process described for the desulfurizer B. A new desulfurizer (desulfurizer C) with a sulfur capacity of 46% was obtained.

After four rounds of desulfurizing and regenerating, the fifth desulfurizer generated (desulfurizer E) had a sulfur capacity of 40%.

880 g solid K$_2$CO$_3$ was prepared into solution and placed in reaction tank and then a solution prepared with 1270 g solid FeCl$_2$ was put into the reaction tank and the mixture was stirred simultaneously, until the pH value of mixed solution reached 8.0. After 0.5 h, the solution was filtered and filter cake was washed until the weight proportion of K$^+$ in the filter cake less than 0.5%. The filter cake was prepared into suspension, in which the weight proportion of solid is 15%. Then air was fed into the suspension for oxidation until the weight proportion of Fe$^{2+}$/Fe$_t$ less than 1%. Then the solution was filtered and the resultant solid was dried at 90° C. to yield a composition comprising amorphous iron oxide hydroxide. In the composition, the weight percentage of amorphous iron oxide hydroxide was 81% and the other ingredients were KCl, water, Fe$_3$O$_4$, and impurity unknown, with a sulfur capacity of 50.2%.

The content of K$^+$ was analysed through flame spectrometry. The following examples are the same.

The processes for preparation and regeneration of the desulfurizer are described below:

400 g composition comprising amorphous iron oxide hydroxide with a particle size of 100 mesh, 48 g sesbania powder and 5 g rice dull powder were mixed uniformly, kneaded with appropriate quantities of water using a small kneader, and extruded using a small twin screw extruder to yield a strip. The strip was subsequently treated using a pill machine to yield a pill desulfurizer. The desulfurizer was roasted in an oven at 60° C. for 7 h, and the sulfur capacity thereof was measured to be 47.5%. The desulfurizer was named desulfurizer (A).

The desulfurizer A was added to a desulfurization reactor. After H$_2$S passing through the reactor, the resultant waste mixture was unloaded, washed with water and ground in the presence of water using a wet ball mill into powders of particle size 200 mesh. An aqueous suspension of the powders was prepared with a solid weight percentage of 15%, compressed air was charged, and a sample was collected for testing after a period of reaction. When no H$_2$S was produced from the reaction between the sample and hydrochloric acid, the iron sulfide in the suspension was determined to be completely transformed into a slurry comprising amorphous iron oxide hydroxide and elemental sulfur. The slurry was filtered to yield a solid that was extracted thrice with CS$_2$. The extract was combined and distilled to yield crystallized elemental sulfur. The remaining solid after extraction was a composition comprising amorphous iron oxide hydroxide. The composition comprising amorphous iron oxide hydroxide was roasted at 70° C., and sesbania powder and rice hull powder were added according to the proportions described above. The mixture was treated according to the method and reaction conditions described above to yield a new desulfurizer (desulfurizer B) with a sulfur capacity of 43%.

The desulfurizer (B) was used for desulfurization in desulfurization reactor, and the resultant waste mixture was unloaded after passing H2S through the reactor. Then the resultant waste mixture was regenerated according to the process described for the regeneration of desulfurizer A. Then sesbania powder and rice hull powder were added according to the proportions described above. The mixture was treated according to the method and reaction conditions described above to yield a new desulfurizer (desulfurizer C) with a sulfur capacity of 40.5%.

EXAMPLE 18

The process for preparing the composition containing amorphous iron oxide hydroxide comprises the following steps:

EXAMPLE 19

The process for preparing the composition containing amorphous iron oxide hydroxide comprises the following steps:

3040 g solid $FeSO_4 \cdot 7H_2O$ was prepared into solution and placed in reaction tank and then a solution prepared with 1840 g solid $NaHCO_3$ was put into the reaction tank and the mixture was stirred simultaneously until the PH value of mixed solution reached 8.5. After 0.5 h, the solution was filtered and filter cake was washed until the weight proportion of $Na^+$ in the filter cake less than 0.5%. The filter cake was prepared into suspension, in which the weight proportion of solid is 30%. Then air was fed into the suspension for oxidation until the weight proportion of $Fe^{2+}/Fe_t$ less than 1%. Then the solution was filtered and the resultant solid was dried at 45° C. to yield a composition comprising amorphous iron oxide hydroxide. In the composition, the weight percentage of amorphous iron oxide hydroxide was 80% and the other ingredients were $Na_2SO_4$, water and $TiO_2$, with a sulfur capacity of 49.6%.

The processes for preparation and regeneration of the desulfurizer are described below:

1000 g composition comprising amorphous iron oxide hydroxide with a particle size of 100 mesh and 80 g sesbania powder were mixed uniformly in a mixer and extruded using a water chestnut shape sugar-coating machine to yield a ball desulfurizer (Φ3-5). The desulfurizer was roasted in an oven at 90° C. for 4 h, and the sulfur capacity thereof was measured to be 48%. The desulfurizer was named desulfurizer (A).

The desulfurizer (A) was added to a desulfurization reactor. After $H_2S$ passing through the reactor, the resultant waste mixture was unloaded, washed with water and ground in the presence of water using a wet ball mill into powders of particle size 400 mesh. An aqueous suspension of the powders was prepared with a solid weight percentage of 5%, compressed air was charged, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank. Water was added, and water glass and kerosene were further added as auxiliary agents, and air was charged into the slurry, and the elemental sulfur, additive, and binder were removed, together with excess air, from the tank by overflowing. The precipitate at the bottom of the tank was a composition comprising amorphous iron oxide hydroxide. The overflowed elemental sulfur could be purified by extraction or other methods. The composition comprising amorphous iron oxide hydroxide was roasted at 80° C., and sesbania powder was added according to the proportions listed above. The mixture was treated following the method and reaction conditions described above to yield a new desulfurizer (Desulfurizer B) with a sulfur capacity of 45%.

The desulfurizer B was used for desulfurization in desulfurization reactor, the resultant waste mixture was unloaded after $H_2S$ passing through the reactor. The resultant waste mixture was regenerated according to the process described for the regeneration of desulfurizer A and then roasted. Sesbania powder was added according to the proportions listed above. The mixture was treated following the method and reaction conditions described above to yield a new desulfurizer (C) with a sulfur capacity of 42%.

The auxiliary agent accelerated the separation of amorphous iron oxide hydroxide and elemental sulfur. The following examples are the same.

EXAMPLE 20

The process for preparing the composition containing amorphous iron oxide hydroxide comprises the following steps:

1280 g solid $KHCO_3$ was prepared into solution and placed in reaction tank and then a solution prepared with 1270 g solid $FeCl_2$ was put into the reaction tank and the mixture was stirred simultaneously, until the pH value of mixed solution reached 8.0. After 1.5 h, the solution was filtered and filter cake was washed until the weight proportion of $K^+$ in the filter cake less than 0.5%. The filter cake was prepared into suspension, in which the weight proportion of solid is 10%. Then air was fed into the suspension for oxidation until the weight proportion of $Fe^{2+}/Fe_t$ less than 1%. Then the solution was filtered and the resultant solid was dried at 30° C. to yield a composition comprising amorphous iron oxide hydroxide. In the composition, the weight percentage of amorphous iron oxide hydroxide was 88% and the other ingredients were KCl, water and impurity unknown, with a sulfur capacity of 54.6%.

The processes for preparation and regeneration of the desulfurizer are described below:

500 g composition comprising amorphous iron oxide hydroxide with a particle size of 100 mesh, 45 g sodium carboxymethylcellulose (dissolved in advance), and 10 g wheat bran powder were mixed uniformly, kneaded with appropriate quantities of water using a small kneader, and extruded using a small twin screw extruder to yield a strip that was subsequently treated with a pill machine to yield a pill desulfurizer. The desulfurizer was roasted in an oven at 75° C. for 5 h and the sulfur capacity thereof was measured to be 52%. The desulfurizer was named desulfurizer (A).

The desulfurizer (A) was added to a desulfurization reactor. After $H_2S$ passing through the reactor, the resultant waste mixture was unloaded, washed with water and ground in the presence of water using a wet ball mill into powders with particle size 200 mesh. An aqueous suspension of the powders was prepared with a solid weight percentage of 30%, compressed air was charged into the slurry, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was placed into a flotation tank. Water was added, and water glass and kerosene were added as auxiliary agents and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 75° C., and sodium carboxymethylcellulose (dissolved in advance) as well as wheat bran powders was added according to the proportions described above. The mixture was treated according to the method and reaction conditions described above to yield a new desulfurizer (desulfurizer B) with a sulfur capacity of 49%.

The desulfurizer (B) was used for desulfurization in desulfurization reactor and the resultant waste mixture was unloaded after passing $H_2S$ through the reactor. The resultant waste mixture was regenerated according to the process described for the regeneration of desulfurizer (A), and sodium carboxymethylcellulose as well as wheat bran powders was added according to the proportions described above. The mixture was treated according to the method and reaction conditions described above to yield a new desulfurizer (C) with a sulfur capacity of 47%.

After four rounds of desulfurizing and regeneration described above, a fifth desulfurizer (desulfurizer E) with a sulfur capacity of 42% was obtained.

EXAMPLE 21

The process for preparing the composition containing amorphous iron oxide hydroxide comprises the following steps:

Solid $Fe(NO_3)_2$ was prepared into solution and placed in reaction tank and then a solution prepared with solid $(NH_4)_2CO_3$ was put into the reaction tank and the mixture was stirred simultaneously. The pH value of mixed solution reached 7.5 at the end of reaction. The solution was filtered and filter cake was washed until the weight proportion of $NH_4^+$ in the filter cake less than 0.5%. The filter cake was prepared into suspension, in which the weight proportion of solid is 10%. Then air was fed into the suspension for oxidation until the weight proportion of $Fe^{2+}/Fe_t$ less than 1%. Then the solution was filtered and the resultant solid was dried at 85° C. to yield a composition comprising amorphous iron oxide hydroxide. In the composition, the weight percentage of amorphous iron oxide hydroxide was 99% and the other ingredients were water, with a sulfur capacity of 59%. The content of $NH_4^+$ was analysed through Nessler's reagent.

The content of solid $(NH_4)_2CO_3$ or the ratio of two materials is controlled through controlling the pH value of solution in this example. The following examples are the same.

The processes for preparation and regeneration of the desulfurizer are described below:

500 g the composition comprising amorphous iron oxide hydroxide with a particle size of 100 mesh and 50 g cellulose powder were mixed uniformly, kneaded with appropriate quantities of water using a small kneader, and extruded using a small twin screw extruder to yield a strip that was subsequently treated using a pill machine to yield a pill desulfurizer. The desulfurizer was roasted in an oven at 80° C. for 4 h and the sulfur capacity thereof was measured to be 56%. The desulfurizer was named desulfurizer (A).

The desulfurizer A was added to a desulfurization reactor. After $H_2S$ passing through the reactor, the resultant waste mixture was unloaded, washed with water and ground in the presence of water using a wet ball mill into powders with a particle size of 200 mesh. An aqueous suspension of the powders was prepared with a solid weight percentage of 15%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The remaining solid after extraction was a composition comprising amorphous iron oxide hydroxide. The composition comprising amorphous iron oxide hydroxide was roasted at 70° C., and cellulose powders were added according to the proportions described above. The mixture was treated following the method and reaction conditions described above to yield a new desulfurizer (B) with a sulfur capacity of 54%.

The desulfurizer (B) was used for desulfurization in desulfurization reactor and the resultant waste mixture was unloaded after $H_2S$ passing through the reactor. The resultant waste mixture was regenerated according to the process described for the regeneration of desulfurizer (A). Then cellulose powders were added according to the proportions described above. The mixture was treated following the method and reaction conditions described above to yield a new desulfurizer (C) with a sulfur capacity of 50%.

After four rounds of desulfurizing and regeneration described above, a fifth desulfurizer (desulfurizer E) with a sulfur capacity of 45% was obtained.

EXAMPLE 22

The process for preparing the composition containing amorphous iron oxide hydroxide comprises the following steps:

Solid $NaHCO_3$ was prepared into solution and placed in reaction tank and then a solution prepared with solid $FeCl_2$ was put into the reaction tank and the mixture was stirred simultaneously. The pH value of mixed solution reached 8 at the end of reaction. The solution was filtered and filter cake was washed until the weight proportion of $Na^+$ in the filter cake less than 0.5%. The filter cake was prepared into suspension, in which the weight proportion of solid is 5%. Then air was fed into the suspension for oxidation until the weight proportion of $Fe^{2+}/Fe_t$ less than 1%. Then the solution was filtered and the resultant solid was dried at 70° C. to yield a composition comprising amorphous iron oxide hydroxide. In the composition, the weight percentage of amorphous iron oxide hydroxide was 92%, and the other ingredients were NaCl, water and impurity unknown, with a sulfur capacity of 57%. The content of $Cl^-$ was analysed through mercuric thiocyanate colorimetry.

The processes for preparation and regeneration of the desulfurizer are described below:

500 g composition comprising amorphous iron oxide hydroxide and with a particle size of 100 mesh, 40 g cellulose powder, and 6 g rice hull powder were mixed uniformly, kneaded with appropriate quantities of water using a small kneader, and extruded using a small twin screw extruder to yield a strip that was subsequently treated using a pill machine to yield a pill desulfurizer. The desulfurizer was dried naturally at room temperature for 20 h and the sulfur capacity thereof was measured to be 55%. The desulfurizer was named desulfurizer (A).

The desulfurizer A was added to a desulfurization reactor. After $H_2S$ passed through the reactor, the resultant waste mixture was unloaded, washed with water and ground in the presence of water using a wet ball mill into powders with a particle size of 200 mesh. An aqueous suspension of the powders was prepared with a solid weight percentage of 30%, compressed air was charged, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was placed in a flotation tank. Water was added, and water glass and kerosene were further added as auxiliary agents, and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 75° C., and cellulose powder and rice hull powder were added according to the proportions described above. The mixture was treated according to the method and reaction conditions described above to yield a new desulfurizer (B) with a sulfur capacity of 51%.

The desulfurizer B was used for desulfurization in desulfurization reactor and the resultant waste mixture was unloaded after $H_2S$ passing through the reactor. The resultant waste mixture was regenerated according to the process described for the regeneration of desulfurizer A, and cellulose powder and rice hull powder were added according to the proportions described above. The mixture was treated according to the method and reaction conditions described above to yield a new desulfurizer (C) with a sulfur capacity of 47%.

EXAMPLE 23

The process for preparing the composition containing amorphous iron oxide hydroxide comprises the following steps:

Solid $FeSO_4.7H_2O$ was prepared into solution and then mixed with $KHCO_3$ solution flowing together. The mixed solution was reacted in reaction tank. The pH value of mixed solution reached 8.5 at the end of reaction. The solution was filtered and filter cake was oxidated naturally in air until the weight proportion of $Fe^{2+}/Fe_t$ was less than 10%. Then the filter cake was washed until the weight proportion of $K^+$ in the filter cake was less than 1%. Then the solution was filtered and the resultant solid was dried at 60° C. to yield a composition comprising amorphous iron oxide hydroxide. In the composition, the weight percentage of amorphous iron oxide hydroxide was 86%, and the other ingredients were $K_2SO_4$, water and impurity unknown, with a sulfur capacity of 53%.

The processes for preparation and regeneration of the desulfurizer are described below:

500 g composition comprising amorphous iron oxide hydroxide with a particle size of 100 mesh and 67 g sodium carboxymethylcellulose (dissolved in advance) were mixed uniformly, kneaded with appropriate quantities of water using a small kneader, and extruded using a small twin screw extruder to yield a strip that was subsequently treated using a pill machine to yield a pill desulfurizer. The desulfurizer was roasted in an oven at 75° C. for 5 h, and the sulfur capacity thereof was measured to be 49%. The desulfurizer was named desulfurizer (A).

The desulfurizer A was added to a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percentage of 30%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was placed into a flotation tank. Water was added, and water glass and kerosene were further added as auxiliary agents, and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 75° C., and sodium carboxymethylcellulose (dissolved in advance) was added according to the proportions described above. The mixture was treated according to the method and reaction conditions described above to yield a new desulfurizer (B) with a sulfur capacity of 47%.

The desulfurizer (B) was used for desulfurization in desulfurization reactor and the resultant waste mixture was unloaded after $H_2S$ passing through the reactor. The resultant waste mixture was regenerated according to the process described for the regeneration of desulfurizer (A), and sodium carboxymethylcellulose was added according to the proportions described above. The mixture was treated according to the method and reaction conditions described above to yield a new desulfurizer (C) with a sulfur capacity of 45.5%.

After four rounds of desulfurizing and regeneration, the fifth desulfurizer (E) had a sulfur capacity of 42%.

EXAMPLE 24

The process for preparing the composition containing amorphous iron oxide hydroxide comprises the following steps:

Solid $FeSO_4.7H_2O$ was prepared into solution and the mixed with $NH_4HCO_3$ solution flowing together. The mixed solution was reacted in reaction tank. The pH value of mixed solution reached 8 at the end of reaction. The solution was filtered and filter cake was oxidated naturally in air until the weight proportion of $Fe^{2+}/Fe_t$ was less than 10%. Then the filter cake was washed until the weight proportion of $NH_4^+$ in the filter cake was less than 0.5%. Then the solution was filtered and the resultant solid was dried at −5° C. to yield a composition comprising amorphous iron oxide hydroxide. In the composition, the weight percentage of amorphous iron oxide hydroxide was 75%, and the other ingredients were $(NH_4)_2SO_4$, water, and $Fe_3O_4$, with a sulfur capacity of 46.5%.

The processes for preparation and regeneration of the desulfurizer are described below:

485 g the composition comprising amorphous iron oxide hydroxide with a particle size of 100 mesh, 40 g sesbania powder, and 25 g wheat bran powder were mixed uniformly, kneaded with appropriate quantities of water using a small kneader, and extruded using a small twin screw extruder to yield a strip desulfurizer. The desulfurizer was roasted in an oven at 30° C. for 15 h and the sulfur capacity thereof was measured to be 42%. The desulfurizer was named desulfurizer (A).

The desulfurizer (A) was added to a desulfurization reactor. After $H_2S$ passing through the reactor, the resultant waste mixture was unloaded, washed with water and ground in the presence of water using a wet ball mill into powders of particle size 100 mesh. An aqueous suspension of the powders was prepared with a solid weight percentage of 10%, compressed air was charged, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank. After water was added and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 80° C., and sesbania and wheat bran powders were added in the proportions described above. The mixture was treated following the method and reaction conditions described above to yield a new desulfurizer (B) with a sulfur capacity of 41%.

The desulfurizer (B) was used for desulfurization in desulfurization reactor and the resultant waste mixture was unloaded after $H_2S$ passing through the reactor. The resultant waste mixture was regenerated according to the process described for the regeneration of desulfurizer (A) and then roasted. Sesbania and wheat bran powders were added in the proportions described above. The mixture was treated following the method and reaction conditions described above to yield a new desulfurizer (C) with a sulfur capacity of 38%.

EXAMPLE 25

400 g desulfurizer (e) regenerated in example 1 and 100 g composition comprising amorphous iron oxide hydroxide prepared in accordance with example 1, with a particle size of 100 mesh, 35 g sesbania powder and 20 g sawdust were mixed uniformly, kneaded with appropriate quantities of water using a small kneader, and extruded using a small twin screw extruder to yield a strip desulfurizer. The desulfurizer was dried naturally for 10 h in air, and the sulfur capacity thereof was measured to be 43%.

EXAMPLE 26

The process for preparing the composition containing amorphous iron oxide hydroxide comprises the following steps:

3040 g solid $FeSO_4$ was prepared into solution and placed in reaction tank and then 1160 g solid $Na_2CO_3$ was put into the reaction tank and the mixture was stirred simultaneously, until the pH value of mixed solution reached 8. After 0.5 h, the solution was filtered and filter cake was washed until the weight proportion of $Na^+$ in the filter cake was less than 0.5%. The filter cake was prepared into suspension, in which the weight proportion of solid is 30%. Then air was fed into the suspension for oxidation until the weight proportion of $Fe^{2+}/Fe_t$ was less than 1%. Then the solution was filtered and the resultant solid was dried at 100° C. to yield a composition comprising amorphous iron oxide hydroxide. In the composition, the weight percentage of amorphous iron oxide hydroxide was 85% and the other ingredients were $NaSO_4$, water and $TiO_2$ ($TiO_2$ is impurity in $FeSO_4$, the following examples are the same), with a sulfur capacity of 53%.

$Fe_t$ in this example is the total content of Ferrum element. $Fe^{2+}/Fe_t$ was analysed through phenanthroline spectrophotometry. The content of $Na^+$ was analysed through flame spectrometry. the weight percentage of amorphous iron oxide hydroxide in the composition was analysed through the titanium trichloride-potassium dichromate volumetric method, and this method is one of the National Standards (GB6730.5-86) for analyzing the Iron ore. The following examples are the same.

The processes for preparation and regeneration of the desulfurizer are described below:

500 g composition comprising amorphous iron oxide hydroxide with a particle size of 100 mesh, 40 g sesbania powder, and 10 g sawdust were mixed uniformly, kneaded with appropriate quantities of water using a small kneader, and extruded using a small twin screw extruder to yield a strip desulfurizer. The desulfurizer was roasted in an oven at 70° C. for 6 h and the sulfur capacity thereof was measured to be 50%. The desulfurizer was named desulfurizer (A).

The desulfurizer A was added to a desulfurization reactor. After $H_2S$ passing through the reactor, the resultant waste mixture was unloaded, washed with water and ground in the presence of water using a wet ball mill into powders of particle size 100 mesh. An aqueous suspension of the powders was prepared with a solid weight percentage of 10%. Compressed air was charged into the slurry and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank, water was added, and air was charged. The elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 80° C., and sesbania powder and sawdust were added according to the proportions described above. The mixture was treated in accordance with the method and reaction conditions described above to yield a new desulfurizer (B) with a sulfur capacity of 48%.

The desulfurizer B was used as desulfurization in desulfurization reactor and the resultant waste mixture was unloaded after $H_2S$ passing through the reactor. The resultant waste mixture was regenerated according to the process described for the desulfurizer A and then roasted. Sesbania powder and sawdust were added according to the proportions described above. The mixture was treated in accordance with the method and reaction conditions described above to yield a new desulfurizer (C) with a sulfur capacity of 46%.

After four rounds of desulfurizing and regenerating, the fifth desulfurizer generated (E) had a sulfur capacity of 40%.

EXAMPLE 27

The process for preparing the composition containing amorphous iron oxide hydroxide comprises the following steps:

1270 g solid $FeCl_2$ was prepared into solution and placed in reaction tank and then 880 g solid $K_2CO_3$ was put into the reaction tank and the mixture was stirred simultaneously, until the pH value of mixed solution reached 8.0. After 1 h, the solution was filtered and filter cake was washed until the weight proportion of $K^+$ in the filter cake was less than 0.5%. The filter cake was prepared into suspension, in which the weight proportion of solid is 15%. Then air was fed into the suspension for oxidation until the weight proportion of $Fe^{2+}/Fe_t$ was less than 1%. Then the solution was filtered and the resultant solid was dried at 90° C. to yield a composition comprising amorphous iron oxide hydroxide. In the composition, the weight percentage of amorphous iron oxide hydroxide was 80% and the other ingredients were KCl, water, $Fe_3O_4$ and impurity unknown, with a sulfur capacity of 49.6%.

The content of $K^+$ was analysed through flame spectrometry. The following examples are the same.

The processes for preparation and regeneration of the desulfurizer are described below:

400 g composition comprising amorphous iron oxide hydroxide with a particle size of 100 mesh, 48 g sesbania powder, and 5 g rice hull powder were mixed uniformly, kneaded with appropriate quantities of water using a small kneader, and extruded using a small twin screw extruder to yield a strip. The strip was subsequently treated using a pill machine to yield a pill desulfurizer. The desulfurizer was roasted in an oven at 60° C. for 7 h, and the sulfur capacity thereof was measured to be 47%. The desulfurizer was named desulfurizer (A).

The desulfurizer (A) was added To a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percentage of 15%, compressed air was charged, and a sample was collected for testing after a period of reaction. When no $H_2S$ was produced from the reaction between the sample and hydrochloric acid, the iron sulfide in the suspension was determined to be completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The remaining solid after extraction was a composition comprising amorphous iron oxide hydroxide. The composition comprising amorphous iron oxide hydroxide was roasted at 70° C., and sesbania powder and rice hull powder were added according to the proportions described above. The mixture was treated according to the method and reaction conditions described above to yield a new desulfurizer (B) with a sulfur capacity of 44.5%.

The desulfurizer B was used for desulfurization in desulfurization reactor and the resultant waste mixture was unloaded after $H_2S$ passing through the reactor. The resultant waste mixture was regenerated according to the process described for the regeneration of desulfurizer A. Then sesbania powder and rice hull powder were added according to the proportions described above. The mixture was treated according to the method and reaction conditions described above to yield a new desulfurizer (C) with a sulfur capacity of 42.5%.

EXAMPLE 28

The process for preparing the composition containing amorphous iron oxide hydroxide comprises the following steps:

1520 g solid $FeSO_4.7H_2O$ was prepared into solution and placed in reaction tank and then 920 g solid $NaHCO_3$ was put into the reaction tank and the mixture was stirred simultaneously, until the pH value of mixed solution reached 8.0. After 0.5 h, the solution was filtered and filter cake was washed until the weight proportion of $Na^+$ in the filter cake less than 0.5%. The filter cake was prepared into suspension, in which the weight proportion of solid is 30%. Then air was fed into the suspension for oxidation until the weight proportion of $Fe^{2+}/Fe_t$ less than 1%. Then the solution was filtered and the resultant solid was dried at 45° C. to yield a composition comprising amorphous iron oxide hydroxide. In the composition, the weight percentage of amorphous iron oxide hydroxide was 80% and the other ingredients were $Na_2SO_4$, water, and $TiO_2$, with a sulfur capacity of 49.6%.

The processes for preparation and regeneration of the desulfurizer are described below:

1000 g composition comprising amorphous iron oxide hydroxide with particle size 100 mesh and 80 g sesbania powder were mixed uniformly in a mixer and extruded using a water chestnut shape sugar-coating machine to yield a ball desulfurizer (Φ3-5). The desulfurizer was roasted in an oven at 90° C. for 4 h, and the sulfur capacity thereof was measured to be 48%. The desulfurizer was named desulfurizer (A).

The desulfurizer (A) was added to a desulfurization reactor. After $H_2S$ passing through the reactor, the resultant waste mixture was unloaded, washed with water and ground in the presence of water using a wet ball mill into powders with particle size 400 mesh. An aqueous suspension of the powders was prepared with a solid weight percentage of 5%, compressed air was charged, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank. Water was added, and water glass and kerosene were further added as auxiliary agents, and air was charged into the slurry, and the elemental sulfur, additive, and binder were removed, together with excess air, from the tank by overflowing. The precipitate at the bottom of the tank was a composition comprising amorphous iron oxide hydroxide. The overflowed elemental sulfur could be purified by extraction or other methods. The composition comprising amorphous iron oxide hydroxide was roasted at 80° C., and sesbania powder was added according to the proportions listed above. The mixture was treated following the method and reaction conditions described above to yield a new desulfurizer (B) with a sulfur capacity of 46%.

The desulfurizer B was used for desulfurization in desulfurization reactor and the resultant waste mixture was unloaded after $H_2S$ passing through the reactor. The resultant waste mixture was regenerated according to the process described for the regeneration of desulfurizer A and then roasted. Sesbania powder was added according to the proportions listed above. The mixture was treated following the method and reaction conditions described above to yield a new desulfurizer (C) with a sulfur capacity of 44%.

After four applications of the process, a fifth desulfurizer (E) with a sulfur capacity of 40% was obtained.

The auxiliary agent accelerated the separation of amorphous iron oxide hydroxide and elemental sulfur. The following examples are the same.

EXAMPLE 29

The process for preparing the composition containing amorphous iron oxide hydroxide comprises the following steps:

1270 g solid $FeCl_2.4H_2O$ was prepared into solution and placed in reaction tank and then 1280 g solid $KHCO_3$ was put into the reaction tank and the mixture was stirred simultaneously, until the pH value of mixed solution reached 8.0. After 1.5 h, the solution was filtered and filter cake was washed until the weight proportion of $K^+$ in the filter cake was less than 0.5%. The filter cake was prepared into suspension, in which the weight proportion of solid is 10%. Then air was fed into the suspension for oxidation until the weight proportion of $Fe^{2+}/Fe_t$ less than 1%. Then the solution was filtered and the resultant solid was dried at 30° C. to yield a composition comprising amorphous iron oxide hydroxide. In the composition, the weight percentage of amorphous iron oxide hydroxide was 88% and the other ingredients were KCl, water, and impurity unknown, with a sulfur capacity of 54.6%.

The processes for preparation and regeneration of the desulfurizer are described below:

500 g composition comprising amorphous iron oxide hydroxide with a particle size of 100 mesh, 45 g sodium carboxymethylcellulose (dissolved in advance), and 10 g wheat bran powder were mixed uniformly, kneaded with appropriate quantities of water using a small kneader, and extruded using a small twin screw extruder to yield a strip that was subsequently treated with a pill machine to yield a pill desulfurizer. The desulfurizer was roasted in an oven at 75° C. for 5 h and the sulfur capacity thereof was measured to be 52%.

The desulfurizer (A) was added to a desulfurization reactor. After H$_2$S passing through the reactor, the resultant waste mixture was unloaded, washed with water and ground in the presence of water using a wet ball mill into powders of particle size 200 mesh. An aqueous suspension of the powders was prepared with a solid weight percentage of 30%, compressed air was charged into the slurry, and a sample was collected for testing after a period of reaction. When no H$_2$S was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was placed into a flotation tank. Water was added, and water glass and kerosene were further added as auxiliary agents, and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 75° C., and sodium carboxymethylcellulose (dissolved in advance) as well as wheat bran powders was added according to the proportions described above. The mixture was treated according to the method and reaction conditions described above to yield a new desulfurizer (B) with a sulfur capacity of 49%.

The desulfurizer B was used for desulfurization in desulfurization reactor and the resultant waste mixture was unloaded after H$_2$S passing through the reactor. The resultant waste mixture was regenerated according to the process described for the regeneration of desulfurizer A. Then sodium carboxymethylcellulose as well as wheat bran powders was added according to the proportions described above. The mixture was treated according to the method and reaction conditions described above to yield a new desulfurizer (C) with a sulfur capacity of 47%.

After four rounds of desulfurizing and regeneration, a fifth desulfurizer (E) with a sulfur capacity of 42% was obtained.

EXAMPLE 30

The process for preparing the composition containing amorphous iron oxide hydroxide comprises the following steps:

Solid Fe(NO$_3$)$_2$.6H$_2$O was prepared into solution and placed in reaction tank and then solid (NH$_4$)$_2$CO$_3$ was put into the reaction tank and the mixture was stirred simultaneously. The pH value of mixed solution reached 7.5 at the end of reaction. The solution was filtered and filter cake was washed until the weight proportion of NH$_4^+$ in the filter cake less than 0.5%. The filter cake was prepared into suspension, in which the weight proportion of solid is 10%. Then air was fed into the suspension for oxidation until the weight proportion of Fe$^{2+}$/Fe$_t$ less than 1%. Then the solution was filtered and the resultant solid was dried at 85° C. to yield a composition comprising amorphous iron oxide hydroxide. In the composition, the weight percentage of amorphous iron oxide hydroxide was 99% and the other ingredients were water, with a sulfur capacity of 59%. The content of NH$_4^+$ was analysed through Nessler's reagent.

The content of (NH$_4$)$_2$CO$_3$ solid or the ratio of two materials is controlled through controlling the pH value of solution in this example. The following examples are the same.

The processes for preparation and regeneration of desulfurizer are described below:

500 g composition comprising amorphous iron oxide hydroxide and with a particle size of 100 mesh and 50 g cellulose powder were mixed uniformly, kneaded with appropriate quantities of water using a small kneader, and extruded using a small twin screw extruder to yield a strip that was subsequently treated using a pill machine to yield a pill desulfurizer. The desulfurizer was roasted in an oven at 80° C. for 4 h and the sulfur capacity thereof was measured to be 56%. The desulfurizer was named desulfurizer A.

The desulfurizer A was added to a desulfurization reactor. After H$_2$S passing through the reactor, the resultant waste mixture was unloaded, washed with water and ground in the presence of water using a wet ball mill into powders of particle size 200 mesh. An aqueous suspension of the powders was prepared with a solid weight percentage of 15%, compressed air was charged into the suspension, and a sample was collected for testing after a period of reaction. When no H$_2$S was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with CCl$_4$. The extract was combined and distilled to yield crystallized elemental sulfur. The remaining solid after extraction was a composition comprising amorphous iron oxide hydroxide. The composition comprising amorphous iron oxide hydroxide was roasted at 70° C., and cellulose powders were added according to the proportions described above. The mixture was treated following the method and reaction conditions described above to yield a new desulfurizer (B) with a sulfur capacity of 54%.

The desulfurizer B was used for desulfurization in desulfurization reactor and the resultant waste mixture was unloaded after H$_2$S passing through the reactor. The resultant waste mixture was regenerated according to the process described for the regeneration of desulfurizer A. Cellulose powders were added according to the proportions described above. The mixture was treated following the method and reaction conditions described above to yield a new desulfurizer (C) with a sulfur capacity of 50%.

EXAMPLE 31

The process for preparing the composition containing amorphous iron oxide hydroxide comprises the following steps:

Solid FeCl$_2$.4H$_2$O was prepared into solution and placed in reaction tank and then solid NaHCO$_3$ was put into the reaction tank and the mixture was stirred simultaneously. The pH value of mixed solution reached 8 at the end of reaction. The solution was filtered and filter cake was washed until the weight proportion of Na$^+$ in the filter cake less than 0.5%. The filter cake was prepared into suspension, in which the weight proportion of solid is 5%. Then air was fed into the suspension for oxidation until the weight proportion of Fe$^{2+}$/Fe$_t$ less than 1%. Then the solution was filtered and the resultant solid was dried at 70° C. to yield a composition comprising amorphous iron oxide hydroxide. In the composition, the weight percentage of amorphous iron oxide hydroxide was 92%, and the other ingredients were NaCl, water and impurity unknown, with a sulfur capacity of 57%. The content of Cl$^-$ was analysed through mercuric thiocyanate colorimetry.

The processes for preparation and regeneration of the desulfurizer are described below:

500 g composition comprising amorphous iron oxide hydroxide with a particle size of 100 mesh, 40 g cellulose powder, and 6 g rice hull powder were mixed uniformly, kneaded with appropriate quantities of water using a small kneader, and extruded using a small twin screw extruder to yield a strip that was subsequently treated using a pill machine to yield a pill desulfurizer. The desulfurizer was dried naturally at room temperature for 20 h and the sulfur capacity thereof was measured to be 55%. The desulfurizer was named desulfurizer A.

The desulfurizer A was added to a desulfurization reactor. After $H_2S$ passed through the reactor, the resultant waste mixture was unloaded, washed with water and ground in the presence of water using a wet ball mill into powders of particle size 200 mesh. An aqueous suspension of the powders was prepared with a solid weight percentage of 30%, compressed air was charged, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was placed in a flotation tank. Water was added, and water glass and kerosene were further added as auxiliary agents, and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 75° C., and cellulose powder and rice hull powder were added according to the proportions described above. The mixture was treated according to the method and reaction conditions described above to yield a new desulfurizer (B) with a sulfur capacity of 51%.

The desulfurizer B was used for desulfurization a in desulfurization reactor and the resultant waste mixture was unloaded after $H_2S$ passing through the reactor. The resultant waste mixture was regenerated according to the process described for the regeneration of desulfurizer A. And then cellulose powder and rice hull powder were added according to the proportions described above. The mixture was treated according to the method and reaction conditions described above to yield a new desulfurizer (C) with a sulfur capacity of 47% was obtained.

EXAMPLE 32

The process for preparing the composition containing amorphous iron oxide hydroxide comprises the following steps:

Solid $FeSO_4.7H_2O$ was prepared into solution and placed in reaction tank and then solid $KHCO_3$ was put into the reaction tank and the mixture was stirred simultaneously. The pH value of mixed solution reached 8.5 at the end of reaction. The solution was filtered and filter cake was oxidated naturally in air until the weight proportion of $Fe^{2+}/Fe_t$ less than 1%. Then the filter cake was washed until the weight proportion of $K^+$ in the filter cake less than 1%. Then the solution was filtered and the resultant solid was dried at 60° C. to yield a composition comprising amorphous iron oxide hydroxide. In the composition, the weight percentage of amorphous iron oxide hydroxide was 88%, and the other ingredients were $K_2SO_4$, $TiO_2$, and water, with a sulfur capacity of 56%.

The processes for preparation and regeneration of the desulfurizer are described below:

500 g composition comprising amorphous iron oxide hydroxide with a particle size of 100 mesh and 67 g sodium carboxymethylcellulose (dissolved in advance) were mixed uniformly, kneaded with appropriate quantities of water using a small kneader, and extruded using a small twin screw extruder to yield a strip that was subsequently treated using a pill machine to yield a pill desulfurizer. The desulfurizer was roasted in an oven at 75° C. for 5 h, and the sulfur capacity thereof was measured to be 53%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders of particle size 200 mesh. An aqueous suspension of the powders was prepared with a solid weight percentage of 30%, compressed air was charged into the suspension, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was placed into a flotation tank. Water was added, and water glass and kerosene were further added as auxiliary agents, and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 75° C., and sodium carboxymethylcellulose (dissolved in advance) was added according to the proportions described above. The mixture was treated according to the method and reaction conditions described above to yield a new desulfurizer (B) with a sulfur capacity of 50%.

The desulfurizer B was used for desulfurization in desulfurization reactor and the resultant waste mixture was unloaded after $H_2S$ passing through the reactor. The resultant waste mixture was regenerated according to the process described for the regeneration of desulfurizer A. Sodium carboxymethylcellulose was added according to the proportions described above. The mixture was treated according to the method and reaction conditions described above to yield a new desulfurizer (C) with a sulfur capacity of 48% was obtained.

After four rounds of desulfurizing and regeneration, the fifth desulfurizer (E) had a sulfur capacity of 42%.

EXAMPLE 33

The process for preparing the composition containing amorphous iron oxide hydroxide comprises the following steps:

Solid $FeSO_4.7H_2O$ was prepared into solution and placed in reaction tank and then solid $NH_4HCO_3$ was put into the reaction tank and the mixture was stirred simultaneously. The pH value of mixed solution reached 8 at the end of reaction. The solution was filtered and filter cake was oxidated naturally in air until the weight proportion of $Fe^{2+}/Fe_t$ less than 10%. Then the filter cake was washed until the weight proportion of $NH_4^+$ in the filter cake less than 1%. Then the solution was filtered and the resultant solid was dried at −5° C. to yield a composition comprising amorphous iron oxide hydroxide. In the composition, the weight percentage of amorphous iron oxide hydroxide was 76%, and the other ingredients were $(NH_4)_2SO_4$, $TiO_2$, water, and $Fe_3O_4$, with a sulfur capacity of 47.1%.

The processes for preparation and regeneration of the desulfurizer are described below:

485 g composition comprising amorphous iron oxide hydroxide with a particle size of 100 mesh, 40 g sesbania powder, and 25 g wheat bran powder were mixed uniformly, kneaded with appropriate quantities of water using a small kneader, and extruded using a small twin screw extruder to yield a strip desulfurizer. The desulfurizer was roasted in an oven at 30° C. for 15 h and the sulfur capacity thereof was measured to be 45%. The desulfurizer was named desulfurizer A.

The desulfurizer A was added to a desulfurization reactor. After $H_2S$ passing through the reactor, the resultant waste mixture was unloaded, washed with water and ground in the presence of water using a wet ball mill into powders with a particle size of 100 mesh. An aqueous suspension of the powders was prepared with a solid weight percentage of 10%, compressed air was charged, and a sample was collected for testing after a period of reaction. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank. After water was added and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by extraction or other methods. The composition comprising amorphous iron oxide hydroxide was roasted at 80° C., and sesbania and wheat bran powders were added in the proportions described above. The mixture was treated following the method and reaction conditions described above to yield a new desulfurizer (B) with a sulfur capacity of 43%.

The desulfurizer B was used for desulfurization in desulfurization reactor and the resultant waste mixture was unloaded after $H_2S$ passing through the reactor. The resultant waste mixture was regenerated according to the process described for the regeneration of desulfurizer A and then roasted. Sesbania and wheat bran powders were added in the proportions described above. The mixture was treated following the method and reaction conditions described above to yield a new desulfurizer (C) with a sulfur capacity of 41%.

After four rounds of desulfurizing and regeneration, the fifth desulfurizer (E) had a sulfur capacity of 36%.

EXAMPLE 34

400 g desulfurizer (E) regenerated in example 1 and 100 g composition comprising amorphous iron oxide hydroxide prepared in accordance with example 1, with a particle size of 100 mesh, 35 g sesbania powder and 20 g sawdust were mixed uniformly, kneaded with appropriate quantities of water using a small kneader, and extruded using a small twin screw extruder to yield a strip desulfurizer. The desulfurizer was dried naturally for 10 h in air, and the sulfur capacity thereof was measured to be 43%.

In the examples, the sulfur capacity was measured using a standard gas containing 40,000 ppm $H_2S$ at normal temperatures (between −5 and 45° C.) and normal pressures (generally, one atmospheric pressure); sulfur was measured using a WK-2C integrated microcoulometer (manufactured by Jiangsu Electroanalytical Instrument Factory), which had a minimal measurement volume of 0.2 ppm.

In this invention, it should be noted that the soluble ferrous salt is not limited to that disclosed in the examples and further comprises other ferrous salt such as $FeSO_4.7H_2O$, $FeCl_2.4H_2O$, and $Fe(NO_3)_2.6H_2O$. The desulfurizer can be regenerated only if it comprises a composition comprising amorphous iron oxide hydroxide and a binder, no matter what other ingredients are added. So, the desulfurizer comprising a composition comprising amorphous iron oxide hydroxide and a binder falls within the scope of this invention.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

The invention claimed is:

1. A method for preparing a composition comprising amorphous iron oxide hydroxide, comprising the following steps:
   (1) preparing a ferrous salt solution;
   (2) mixing the ferrous salt solution with a carbonate solution, a bicarbonate solution, a carbonate solid, or a bicarbonate solid to form a first mixture, and allowing the first mixture to react to yield a second mixture;
   (3) filtering the second mixture to remove generated soluble salt and yield a filter cake, and washing the filter cake with water; and
   (4) forming a suspension comprising the filter cake, charging the suspension with a gas comprising oxygen, and then filtering and drying the suspension to yield a composition comprising amorphous iron oxide hydroxide.

2. The method of claim 1, wherein the carbonate solid is selected from the group consisting of sodium carbonate, ammonium carbonate and potassium carbonate, and the bicarbonate solid is selected from the group consisting of sodium bicarbonate, ammonium bicarbonate and potassium bicarbonate.

3. The method of claim 1, wherein a pH value of the second mixture is between 7.5 and 8.5.

4. The method of claim 2, wherein $Na^+$, $K^+$, or $NH_4^+$ constitutes less than 0.5 weight % of the filter cake after the filter cake is washed with water.

5. The method of claim 1, wherein the filter cake constitutes between 5 weight % and 30 weight % of the suspension.

6. The method of claim 5, wherein the filter cake constitutes between 10 weight % to 15 weight % of the suspension.

7. The method of claim 1, wherein the temperature at which the drying of the suspension is carried out does not exceed 100° C.

8. The method of claim 7, wherein temperature at which the drying of the suspension is carried out is between 80° C. and 100° C.

9. The method of claim 1, wherein the gas comprising oxygen is air.

10. The method of claim 1, wherein the suspension is charged with the gas comprising oxygen until the weight proportion of $Fe^2/Fe_t$ is less than 1%.

11. The method of claim 1, wherein the amorphous iron oxide hydroxide constitutes between 65 weight % and 100 weight % of the composition.

* * * * *